(12) United States Patent
Kijima et al.

(10) Patent No.: US 8,972,302 B2
(45) Date of Patent: *Mar. 3, 2015

(54) INFORMATION SERVICE METHOD, INFORMATION SERVICE UNIT, RECORDING OR REPRODUCING CONTROLLING METHOD, AND RECORDING AND/OR REPRODUCING UNIT

(75) Inventors: Kaoru Kijima, Tokyo (JP); Yoichiro Sako, Tokyo (JP); Shunsuke Furukawa, Tokyo (JP); Yoriaki Kanada, Kanagawa (JP); Koichi Nakajima, Chiba (JP); Akiya Saito, Kanagawa (JP); Etsuo Shibasaki, Tokyo (JP); Akiko Inoue, Saitama (JP)

(73) Assignees: Sony Corporation, Tokyo (JP); Sony Disc & Digital Solutions Inc., Tokyo (JP)

( * ) Notice: Subject to any disclaimer, the term of this patent is extended or adjusted under 35 U.S.C. 154(b) by 896 days.

This patent is subject to a terminal disclaimer.

(21) Appl. No.: 12/731,184

(22) Filed: Mar. 25, 2010

(65) Prior Publication Data
US 2010/0180125 A1    Jul. 15, 2010

Related U.S. Application Data

(63) Continuation of application No. 10/697,242, filed on Oct. 31, 2003, now Pat. No. 7,783,577.

(30) Foreign Application Priority Data

Nov. 5, 2002 (JP) .................. 2002-321359

(51) Int. Cl.
*G06F 21/00* (2013.01)
*G06Q 20/12* (2012.01)

(52) U.S. Cl.
CPC .................. *G06Q 20/1235* (2013.01)
USPC ......................................... 705/59

(58) Field of Classification Search
CPC .................................... G06Q 20/1235
USPC .......................................... 705/59
See application file for complete search history.

(56) References Cited

U.S. PATENT DOCUMENTS 6,240,185 B1 * 5/2001 Van Wie et al. ............... 380/232
6,499,106 B1   12/2002 Yaegashi et al.
(Continued)

FOREIGN PATENT DOCUMENTS

EP    1 005 028 A1    5/2000
EP    1 231 532 A2    8/2002
(Continued)

OTHER PUBLICATIONS

"Digital Rights Management", Sonera Plaza Medialab, XP-002417422, Feb. 2002, pp. 1-14.

*Primary Examiner* — Charles C Agwumezie
(74) *Attorney, Agent, or Firm* — Oblon, McClelland, Maier & Neustadt, L.L.P.

(57) ABSTRACT

Unique identification information is prerecorded on a disc. The identification information is registered to a server along with user's license when he or she buys the disc. When an terminal unit reproduces data from the disc, identification information is read and transmitted to the server through the Internet. The server creates a key that controls to reproduce data from the disc in accordance with the license identified by the identification information and transmits the key to the terminal unit along with the user's license information for the disc. The terminal unit controls to reproduce contents of the disc in accordance with key and license information transmitted from the server. The license for each disc is managed in accordance with the identification information. Thus, different services can be provided for individual discs.

10 Claims, 9 Drawing Sheets

| UID | ALBUM COMMON NUMBER | SERIAL NUMBER OF EACH DISC |

(56) References Cited

U.S. PATENT DOCUMENTS

| | | | |
|---|---|---|---|
| 6,817,535 B2 | 11/2004 | Epstein | |
| 7,103,663 B2 | 9/2006 | Inoue et al. | |
| 7,295,994 B2 | 11/2007 | Yoshida et al. | |
| 7,549,175 B2 | 6/2009 | Sako et al. | |
| 7,783,577 B2* | 8/2010 | Kijima et al. | 705/59 |
| 2002/0138442 A1 | 9/2002 | Hori et al. | |
| 2002/0178376 A1* | 11/2002 | Miura et al. | 713/200 |
| 2003/0028272 A1 | 2/2003 | Sugiura | |
| 2003/0028490 A1* | 2/2003 | Miura et al. | 705/59 |
| 2003/0105718 A1 | 6/2003 | Hurtado et al. | |
| 2003/0200216 A1* | 10/2003 | Hayes et al. | 707/9 |
| 2004/0117309 A1* | 6/2004 | Inoue et al. | 705/50 |
| 2006/0095381 A1 | 5/2006 | Yokota et al. | |
| 2006/0212722 A1 | 9/2006 | Ginter et al. | |
| 2007/0136597 A1 | 6/2007 | Levy | |
| 2008/0154633 A1* | 6/2008 | Ishibashi et al. | 705/1 |
| 2010/0235633 A1* | 9/2010 | Asano et al. | 713/167 |

FOREIGN PATENT DOCUMENTS

| | | |
|---|---|---|
| JP | 10-233019 | 9/1998 |
| JP | 2000-196585 | 7/2000 |
| JP | 2001-135021 | 5/2001 |
| JP | 2001-209586 | 8/2001 |
| JP | 2002-297453 | 10/2002 |
| JP | 2002-297541 | 10/2002 |
| WO | WO 02-052473 | 7/2002 |
| WO | WO 02-101733 | 12/2002 |

\* cited by examiner

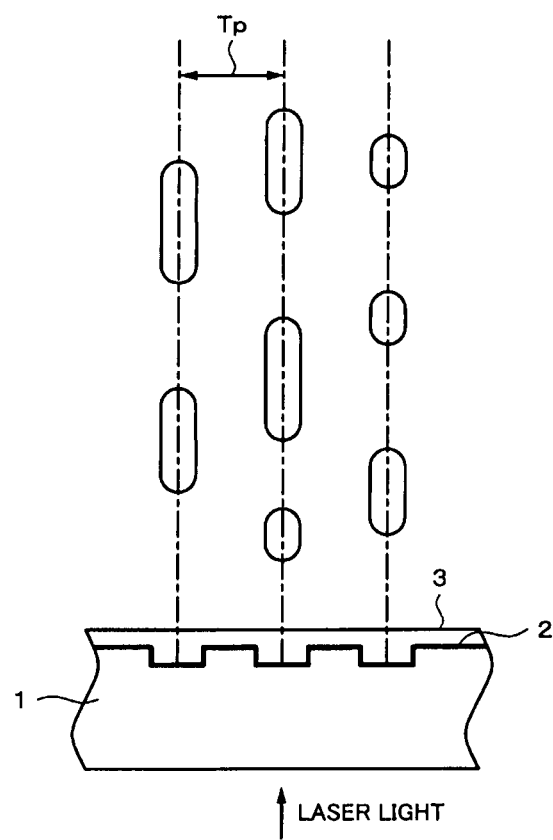

Fig. 7

| UID | ALBUM COMMON NUMBER | SERIAL NUMBER OF EACH DISC |
|---|---|---|
| MANAGEMENT INFORMATION | ATTRIBUTE INFORMATON<br><br>· STAMP FACTORY<br>· LABEL<br>· ALBUM NAME<br>· ARTIST NAME<br>· RELEASE DATE<br>· etc. | DRM INFORMATION (USE LIMIT INFORMATION)<br><br>· COPY LICENSE,<br>· etc. |
| REWRITING OF MANAGEMENT INFORMATION | NOT REWRITTEN | ACTIVATED BY DATA RECEIVED FROM STORE. WHENEVER DATA IS RECEIVED FROM USER'S TERMINAL UNIT, DRM INFORMATION IS REWRITTEN. |

Fig. 8A

| DRM INFORMATION | NUMBER OF TIMES CONTENTS CAN BE REPRODUCED | REPRODUCTON EXPIRATION DATE AND TIME | NUMBER OF TIMES CONTENTS CAN BE COPIED |
|---|---|---|---|

Fig. 8B

| DEFAULT DRM INFORMATOIN | (NUMBRE OF TIMES CONTENTS CAN BE REPRODUCED) | (REPRODUCTION EXPIRATION DATE AND TIME) | (NUMBRE OF TIMES CONTENTS CAN BE COPIED) |
|---|---|---|---|
| | unlimited | unlimited | once |

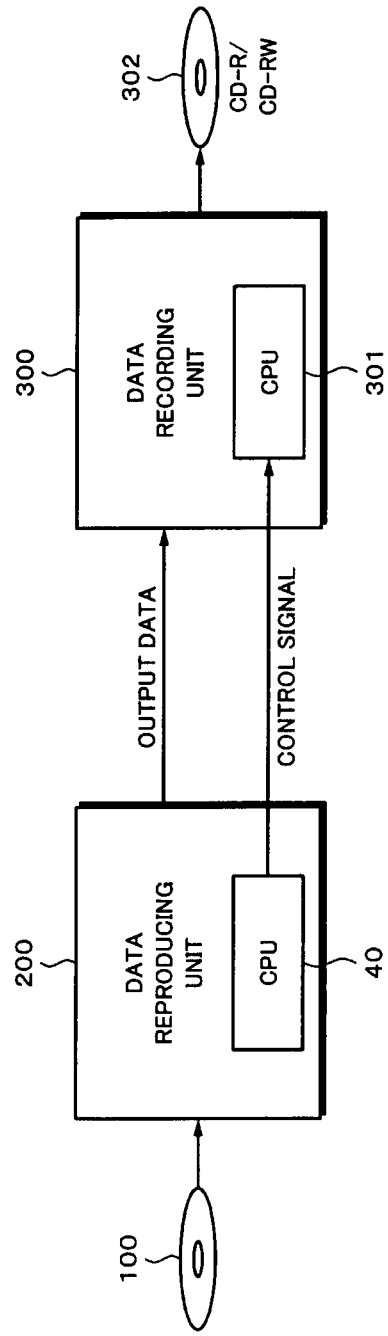

INFORMATION SERVICE METHOD, INFORMATION SERVICE UNIT, RECORDING OR REPRODUCING CONTROLLING METHOD, AND RECORDING AND/OR REPRODUCING UNIT

CROSS-REFERENCE TO RELATED APPLICATIONS

This application is a continuation of and is based upon and claims the benefit of priority under 35 U.S.C. §120 for U.S. Ser. No. 10/697,242, filed Oct. 31, 2003, the entire contents of which are incorporated herein by reference and U.S. Ser. No. 10/697,242 claims the benefit of priority under 35 U.S.C. §119 from Japanese Patent Application No. 2002-321359, filed Nov. 5, 2002.

BACKGROUND OF THE INVENTION

1. Field of the Invention

The present invention relates to a data recording medium having unique identification information, a data recording method using the same, an information terminal unit, an information service method, and an information service unit.

2. Description of the Related Art

Thus far, data recording mediums such as so-called CD family, on which content data is pre-recorded and on which users are prohibited from recording data, have become common. The standard about compact discs (CD), which have been widely used, is referred to as compact disc audio (CD-DA) and based on the description of a standard specification book called Redbook. Based on the specification, various formats for example CD-ROM have been standardized and CD family has been set forth. In the following description, CD generally refers to discs of various formats included in the CD family.

A CD is produced by a stamper using a master disc. Since CDs can be easily produced in quantity, they have been widely used. On the other hand, since CDs are produced by the stamper, it is difficult to record data thereon after they have been produced. Thus, since identification information that identifies CDs is not recorded on CDs, they cannot be identified. Thus, services with which the CDs provide the users are restricted.

To solve such a problem, a technology for adding identification information that is unique to each CD thereto has been proposed. For rewritable data recording mediums such as Compact Disc Re-Writable (CD-RW) discs on which user can record data, a technology for recording a media ID that is unique identification information has been proposed as described in Related Art Reference 1.

RELATED ART REFERENCE

Japanese Patent Laid-Open Publication No HEI 11-250572

Thus far, a system that provides users with services corresponding to data recording mediums such as CDs on which ordinary users cannot record data using identification information uniquely recorded thereon has not been proposed.

Thus, even if encrypted content data is recorded on a CD, a predetermined decryption key has to be manually input so as to decrypt the encrypted content data. Identification information recorded on a CD cannot be used to decrypt encrypted content data.

In addition, license information for content data recorded on a CD cannot be set in accordance with identification information recorded thereon.

At present, a system that protects rights of content data recorded on a data recording medium such as a CD, on which a conventional user cannot record data, and that allows him or her to use his or her content data in his or her favorite manner has been desired.

OBJECTS AND SUMMARY OF THE INVENTION

Therefore, an object of the present invention is to provide an information service method, an information service unit, a recording or reproducing controlling method, and a recording and/or reproducing unit that allow a user to be provided with a service corresponding to a data recording mediums on which the user cannot record data using identification information recorded thereon.

A first aspect of the present invention is an information service method, comprising the steps of: recording identification information that is unique to a non-recordable data recording medium thereto; correlatively storing the identification information recorded on the data recording medium at the identification information recording step and management information of the data recording medium; reading the identification information from the data recording medium when data is reproduced from the data recording medium; transmitting the identification information that has been read at the identification information reading step to a communication network; receiving the identification information transmitted at the transmitting step through the communication network and reading the management information that has been correlated with the identification information and stored at the storing step in accordance with the received identification information; and providing a service in accordance with the management information that has been read at the management information reading step.

A second aspect of the present invention is an information service system, comprising: an identification information recording unit for recording identification information that is unique to a non-recordable data recording medium thereto; an information terminal unit having: reproducing means for reproducing data from the data recording medium, and identification information reading means for reading the identification information from a reproduction output of the reproducing means; and a server unit having: storing means for correlatively storing the identification information and management information of the data recording medium, and wherein the server unit is configured to read the management information stored by the storing means in accordance with the identification information transmitted from the information terminal unit and to provide a service in accordance with the management information to the information terminal unit.

A third aspect of the present invention is a reproducing or recording controlling method, comprising the steps of: reading identification information that is unique to a non-recordable data recording medium therefrom; transmitting the identification information that has been read at the identification information reading step to a server unit that has correlatively stored the identification information and management information of the data recording medium on which the identification information has been recorded; and receiving the management information correlated with the transmitted identification information from the server unit, wherein it is controlled whether to reproduce the content data from the data recording medium or to record the content data reproduced form the data recording medium to another recording medium.

A fourth aspect of the present invention is a reproducing and/or recording controlling unit, comprising: identification information reading means for reading identification information that is unique to a non-recordable data recording medium therefrom; identification information transmitting means for transmitting the identification information that has been read by the identification information reading means to a server unit that has correlatively stored the identification information and management information of the data recording medium on which the identification information has been recorded; and receiving means for receiving from the server unit the management information correlated with the identification information transmitted from the identification information transmitting means, wherein it is controlled whether to reproduce the content data from the data recording medium or to record the content data reproduced from the data recording medium to another data recording medium in accordance with the management information received by the receiving means.

According to the present invention, identification information that is unique to a non-recordable data recording medium is recorded thereto. The identification information recorded on the data recording medium and management information of the data recording medium are correlatively stored. The identification information is read from the data recording medium when data is reproduced from the data recording medium. The identification information that has been read is transmitted to a communication network. The identification information is received through the communication network. The management information that has been correlated with the identification information and stored in accordance with the received identification information is read. A service is provided in accordance with the management information that has been read. Thus, a service in accordance with each data recording medium can be provided.

According to the present invention, identification information that is unique to a non-recordable data recording medium is read therefrom. The identification information that has been read is transmitted to a server unit that has correlatively stored the identification information and management information of the data recording medium on which the identification information has been recorded. The management information correlated with the transmitted identification information is received from the server unit. It is controlled whether to reproduce the content data from the data recording medium or to record the content data reproduced form the data recording medium to another recording medium. With a non-recordable data recording medium on which an ordinary user cannot additionally record data, it can be controlled for each data recording medium whether to reproduce the content data from the data recording medium or to record the content data reproduced form the data recording medium to another recording medium These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 1 is a schematic diagram showing a structure of an example of a UID.

FIG. 2 is an enlarged schematic diagram showing a part of a conventional CD.

FIG. 7 is a schematic diagram showing an example of management information managed by a management server.

FIG. 8 is a schematic diagram showing a structure of an example of use limit information according to the embodiment of the present invention.

FIG. 11 is a schematic diagram describing an example of a method for causing the data reproducing unit to control a data recording unit.

DETAILED DESCRIPTION OF THE PREFERRED EMBODIMENTS

Figure 3:
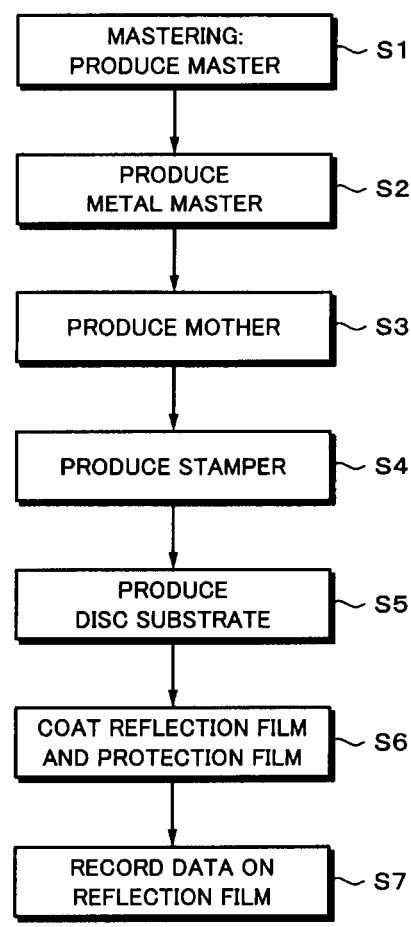
FIG. 3 is a flow chart describing a flow of a production steps of a CD.

Next, with reference to the accompanying drawings, an embodiment of the present invention will be described. According to the present invention, with a data recording medium on which copyrighted content data and unique identification information that identifies an individual are pre-recorded and on which external data cannot be recorded (for example, a CD), the identification information and license information of the content data are correlatively registered to a server. As a result, the license information of content data can be controlled for each recording medium.

When the user side reproduces data from a data recording medium, identification information recorded thereon is sent to a server. The server gives the user a license of content data in accordance with the received identification information. Thus, the user can reproduce, copy, and move content data recorded on the data recording medium in accordance with the license information correlated with the identification information.

In this description, the "copy" represents an operation for almost identically copying copyrighted data recorded on a first data recording medium to a second data recording medium. When the copy operation is performed, data is not erased form the source recording medium (first data recording medium), but remained thereon. Both the original data and copied data can be reproduced. The "move" represents an operation for almost identically copying copyrighted data recorded on a first data recording medium to a second recording medium. In this case, the original data on the first data recording medium cannot be reproduced.

In addition, identification information recorded on each data recording medium is referred to as Unique Identifier (UID). It is preferred that a UID is unique for each data recording medium. For example, a combination of production company number of a production company that produced the data recording medium, a UID writing unit number of a UID writing unit that wrote the UID, and a serial number can be used as a UID. In reality, it is thought that a UID may be unique in the production company and the model name of the data recording medium.

In the case of a CD-DA disc of the CD family, as shown in FIG. 1, a UID is composed of an album common number that represents an album recorded on the CD-DA and a serial number unique to the disc.

Of course, the structure of a UID is not limited to the forgoing structure. In the case of a CD-ROM disc on which conventional data and programs are recorded as a data recording medium, an album common number can be substituted with information that represents a model number. Not limited to two types of information of an album common number and a serial number, a UID may be composed of a combination of more types of information. Alternatively, a UID may be composed of only a serial number.

Next, an example of a method for additionally recording a UID on a CD will be described. A UID is recorded in such a manner that it can be read by for example a conventional CD player or a conventional CD-ROM drive. First of all, for easy understanding, the structure of an optical disc for example a CD, which is included in the CD family, will be described.

FIG. 2 is an enlarged view showing a part of a conventional CD. Concave portions that are referred to as pits and lands that are no-pit areas are alternately formed on tracks having a predetermined track pitch (for example, 1.6 μm). The lengths of pits and lands are in the range from 3 T to 11 T where T represents the minimum inversion interval. Laser light is radiated from the rear surface of the CD.

The CD is composed of a transparent disc substrate 1 having a thickness of 1.2 mm, a reflection film 2 coated thereon, and a protection film 3 coated thereon. As the reflection film 2, one having a high reflectance is used. The CD is a read-only disc. However, as will be described later, after the reflection film 2 is coated, information (UID) is recorded on the reflection film 2 with the laser light.

Next, with reference to FIG. 3, a flow of the production steps of the CD will be described. At step S1, a glass master on which photo resist, which is a photosensitive material, is coated on a glass substrate is rotated by a spindle motor. Laser light that is turned on/off in accordance with a record signal is radiated on the photo resist film. As a result, a master is produced. A developing process is performed for the photo resist film. When the resist is of positive type, the exposed portion is melted. An uneven pattern is formed on the photo resist film.

The photo resist master is plated by an electroplating method. As a result, one metal master is produced (at step S2). With the metal master, a plurality of mothers are produced (at step S3). In addition, with the mother, a plurality of stampers are produced (at step S4). With the stamper, a disc substrate is produced. The disc substrate is produced by the compression molding method, the injection molding method, the light setting method, or the like. At step S6, a reflection film and a protection film are coated. In the conventional disc production method, a label is printed on the CD.

In the example, shown in FIG. 3, laser light is radiated to the reflection film (a mirror portion, for example a land). In addition, information is additionally recorded at step S7. Laser light is radiated on the reflection film. The land on the reflection film is heated (thermally recorded). As a result, atoms are traveled and thereby the film structure and crystallization are varied. Thus, the reflectance of the portion decreases. As a result, after laser light is radiated, the reflection of the laser light from the land becomes small. Thus, a reading unit recognizes the land as a pit. With this characteristics, the pit length or the land length can be varied so as to record information. In this case, the reflection film is made of a material that allows the reflectance thereof to be varied by laser radiation. There is a material whose reflectance increases by the additional recording process.

In reality, the reflection film is made of an aluminum alloy $Al_{100-x}X_x$ where X is at least one element selected from a group consisting of Ge, Ti, Ni, Si, Tb, Fe, and Ag. The composition rate x of the Al alloy film is selected in the range of 5<x<50 [atomic %].

Alternatively, the reflection film may be also made of an Ag alloy film $Ag_{100-x}X_x$ where X is at least one element selected from a group consisting of Ge, Ti, Ni, Si, Tb, Fe, and Al. The composition rate x of the Ag alloy film is selected in the range of 5<x<50 [atomic %]. The reflection film can be formed by for example the magnetron spattering method.

For example, in the condition that the reflection film of AlGe alloy is formed with a thickness of 50 nm, laser light is radiated from a transparent substrate side or a protection film side through an objective lens, if the composition rate of Ge is 20 [atomic %] and the recording power is in the range from 6 to 7 [mW], the reflectance decreases by around 6%. In such a condition, if the composition rate of Ge is 27.6 [atomic %] and the recording power is in the range from 5 to 8 [mW], the reflectance decreases by 7 to 8%. Since the reflectance varies in such a manner, additional data can be recorded on the reflection film.

Figure 4:
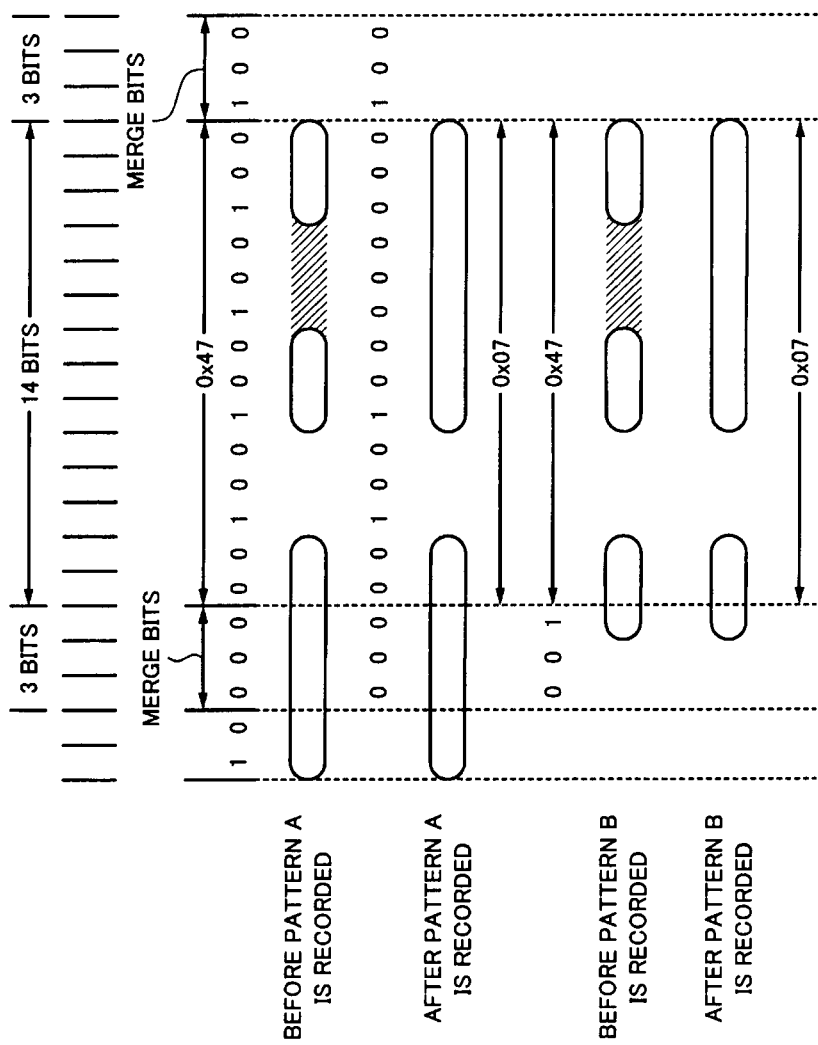
FIG. 4 is a schematic diagram practically describing an additional recording method of a UID.

FIG. 4 is a schematic diagram more practically describing a method for additionally recording a UID. There are two patterns that represent the relation of record data, pits, and lands depending on the preceding pattern. The two patterns are referred to as pattern A and pattern B.

First, the pattern A will be described. Three merging bits for example (000) are inserted between adjacent symbols. When the UIS is recorded, a data symbol of eight bits is for example (0x47) where 0x represents hexadecimal notation. FIG. 4 shows a 14-bit pattern (00100100100100) whose eight bits have been modulated in accordance with the Eight to Fourteen Modulation (EFM) system.

A laser beam with which the UID is recorded is radiated in a hatched area between the two pits. As a result, the reflectance of the hatched area decreases. After the UID has been recorded, the two pits are connected and reproduced as one pit. In this case, the 14-bit pattern becomes (00100100000000). When the 14-bit pattern is EFM-demodulated, it is demodulated as eight bits (0x07).

In the case of the pattern B, the merging bits are (001). In this case, as with the pattern A, when a laser beam is radiated to the hatched area, eight bits can be varied from (0x47) to (0x07).

As described above, a data symbol (0x47) can be rewritten to (0x07). There are many types of data that can be additionally recorded. A data symbol (0x40) can be varied to (0x00). However, when the UID is additionally recorded, laser is radiated to a mirror portion in which data has been recorded so as to vary the pit length or the land length. Thus, the types of data that can be additionally recorded are restricted.

When the reflection film of the CD is peeled off, the UID that has been additionally recorded is lost. Thus, the UID cannot be forged.

According to the embodiment of the present invention, the UID is additionally recorded on a disc 100 when it is shipped from the factory. As described above, the UID is unique to the disc 100. The position at which the UID is recorded on the disc 100 is predetermined. Position information that represents the position of the UID is recorded in a Table Of Contents (TOC) area of the disc 100.

Figure 5:
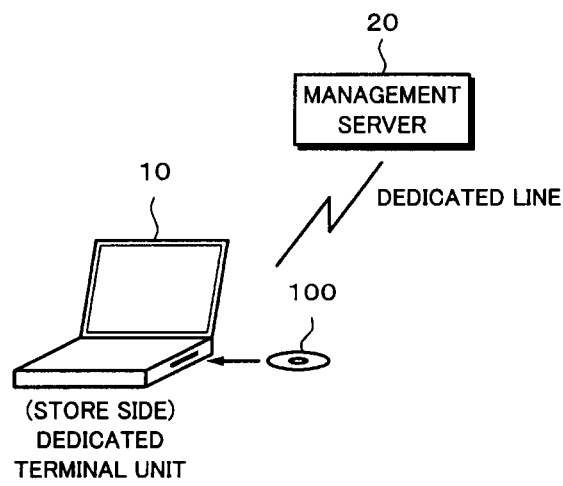
FIG. 5 is a schematic diagram describing a system according to an embodiment of the present invention.
Figure 6:
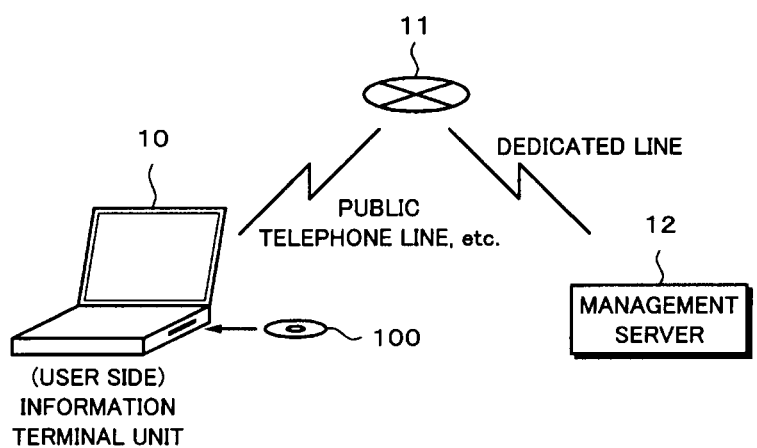
FIG. 6 is a schematic diagram describing the system according to the embodiment of the present invention.

Next, with reference to FIG. 5 and FIG. 6, a system according to the embodiment of the present invention will be described. In FIG. 5, a dedicated terminal unit 10 is for example a terminal unit disposed at a store that sells the disc 100. The dedicated terminal unit 10 has the same structure as a conventional computer unit. In addition, the dedicated terminal unit 10 has a drive device that can read the UID recorded on the disc 100.

The dedicated terminal unit 10 is connected to a management server 20 through a dedicated communication line (hereinafter referred to dedicated line). Of course, the dedicated terminal unit 10 may be connected to the management server 20 through a public telephone line or the like instead of the dedicated line. The management server 20 has a similar structure to a conventional server unit. The management server 20 has a database that correlates the UID and the attribute information of the disc 100 and manages use limit information of the disc 100 identified by the UID.

When the user buys the disc 100 at the store, he or she selects a license of the disc 100 to be bought. The license of the disc 100 is composed of the number of times the contents recorded on the disc 100 can be reproduced, the reproduction expiration date and time, and the number of times the contents can be copied. It is preferred that the user should pay a license fee corresponding to the selected license.

After the license of the disc 100 has been selected, the disc 100 is loaded into the dedicated terminal unit 10. The dedicated terminal unit 10 reads the UID recorded on the disc 100. The UID that has been read is transmitted to the management server 20 through the dedicated line along with the selected license. The license is correlated as use limit information of the disc 100 identified by the UID therewith and stored in the management server 20. The UID and the use limit information are registered as management information to the management server 20.

When the user uses the disc 100 that he or she bought in such a manner, he or she obtains from the management server 20 a key that allows him or her to use the disc 100 in accordance with the UID and the license that have been registered when he or she bought the disc 100. In FIG. 6, an information terminal unit 30 is a user side terminal unit. For example, the information terminal unit 30 is composed of a conventional computer unit. The terminal unit is also provided with a drive unit that allows the user to use the disc 100 with a predetermined key.

The information terminal unit 30 is connected to the Internet 31 through a communication system using a public telephone line such as the Asymmetric Digital Subscriber Line (ADSL) or the Integrated Service Digital Network (ISDN) or a communication system using a Cable Television (CATV) line. The foregoing management server 20 is also connected to the Internet 31 through for example a dedicated line. In other words, the information terminal unit 30 can communicate with the management server 20 through the Internet 31.

When the disc 100 is loaded into the information terminal unit 30, the UID is read from the disc 100. The UID that has been read is transmitted to the management server 20 through the Internet 31. The management server 20 creates a key in accordance with use limit information correlated with the transmitted UID and rewrites the use limit information so that the license is consumed by one level. The created key information is transmitted to the information terminal unit 30 through the Internet 31. The information terminal unit 30 allows the user to use the disc 100 with the key transmitted from the management server 20.

Next, with reference to FIG. 7 and FIG. 8, management information registered in the management server 20 will be practically described. The management server 20 registers and manages management information for each UID. When the disc 100 is for example a CD-DA disc, as shown in "Management Information" field of FIG. 7, the album common number of the UID and the album attribute information represented by the album common number are correlated. The album attribute information is composed of stamp factory information of the factory that produced the disc, a label name of a company that produced the album, an album name, an artist name, and release date information.

On the other hand, the serial number of the UIP of each disc and the use limit information are correlated. In FIG. 7 and FIG. 8, the use limit information is represented as Digital Rights Management (DRM) information. In accordance with the use limit information, a license for reproducing, copying, and moving contents recorded on the disc identified by the UID can be managed for each disc. In other words, the management server 20 can manage the use mode of each disc according to the UID.

FIG. 8A shows a structure of an example of the use limit information (DRM information) according to the embodiment of the present invention. In the example, the use limit information is composed of the number of times the contents recorded on the disc 100 can be reproduced, the reproduction expiration date and time, and the number of times the contents can be copied. The DRM information is correlated with the serial number of each disc 100. As a result, the license of the contents can be controlled for each disc 100.

When the UID is recorded to the disc 100 at the factory, the UID and the attribute information of the disc 100, on which the UID has been recorded, are stored in the management server 20 for each disc 100 (namely, for each UID). At that point, the serial number of each disc (each UID) is correlated with default use limit information and stored. As shown in FIG. 8B, the default use limit information is composed of the number of times the contents can be reproduced, the reproduction expiration date and time, and the number of times the contents can be copied that are for example unlimited, unlimited, and one time, respectively. In such a manner, the default management information for each UID is registered to the management server 20.

The disc 100 whose license information has been registered to the management server 20 is delivered to the store and then sold to the user. At that point, as described above, the UID of the disc 100 is read by the dedicated terminal unit 10 on the store side. The user selects a license for the contents recorded on the disc 100. As a result, the license for the contents recorded on the disc 100 is set.

A license that the user can select is the number of times the contents can be reproduced (for example, unlimited, ten times, or five times), the reproduction expiration date and time (for example, unlimited or one month), and the number of times the contents can be copied (for example, unlimited, three times, one time, or zero time (copy prohibited)). The license scope that the user can select may depend on the fee that the user pays. For example, the default license scope that is set on the store side may be a combination of the number of times the contents can be reproduced=unlimited, the reproduction expiration date and time=unlimited, and the number of times the contents can be copied=0. Depending on the fee that the user pays, the number of times the contents can be copied may be increased against the default license.

The license selected by the user when he or she bought the disc 100 and the UID of the disc 100 whose license was selected are transmitted to the management server 20. These information is received by the management server 20. The management server 20 rewrites the management information identified by the UID in accordance with the received license.

As shown in the field "Rewriting of management information" of FIG. 7, the use limit information (DRM information) correlated with the serial number of each disc is rewritten. The attribute information of the album correlated with the album common number is not rewritten. When the disc 100 was bought at the store, the use limit information is transmitted to the management server 20 and initially set. When the use limit information is initially set, the license for the disc 100 is activated. The user can use the contents recorded on the disc 100 in accordance with the license that was set when he or she bought the disc 100.

The disc 100 that the user bought is loaded into the information terminal unit 30. The user reproduces, copies, and performs other operations for the contents recorded on the disc 100 in accordance with the license that was set when the user bought the disc 100. Whenever the disc 100 is used, data is communicated between the information terminal unit 30 and the management server 20. The use limit information of the management information identified by the UID of the disc 100 is rewritten.

When the number of times of contents can be copied of the use limit information is set to five times and the contents recorded on the disc 100 are copied one time by the information terminal unit 30, the number of times the contents can be copied is decreased by 1 and becomes four times. When the contents of the disc 100 are reproduced one time by the information terminal unit 30, the number of times of contents can be reproduced is not rewritten in the management server 20.

Figure 9:
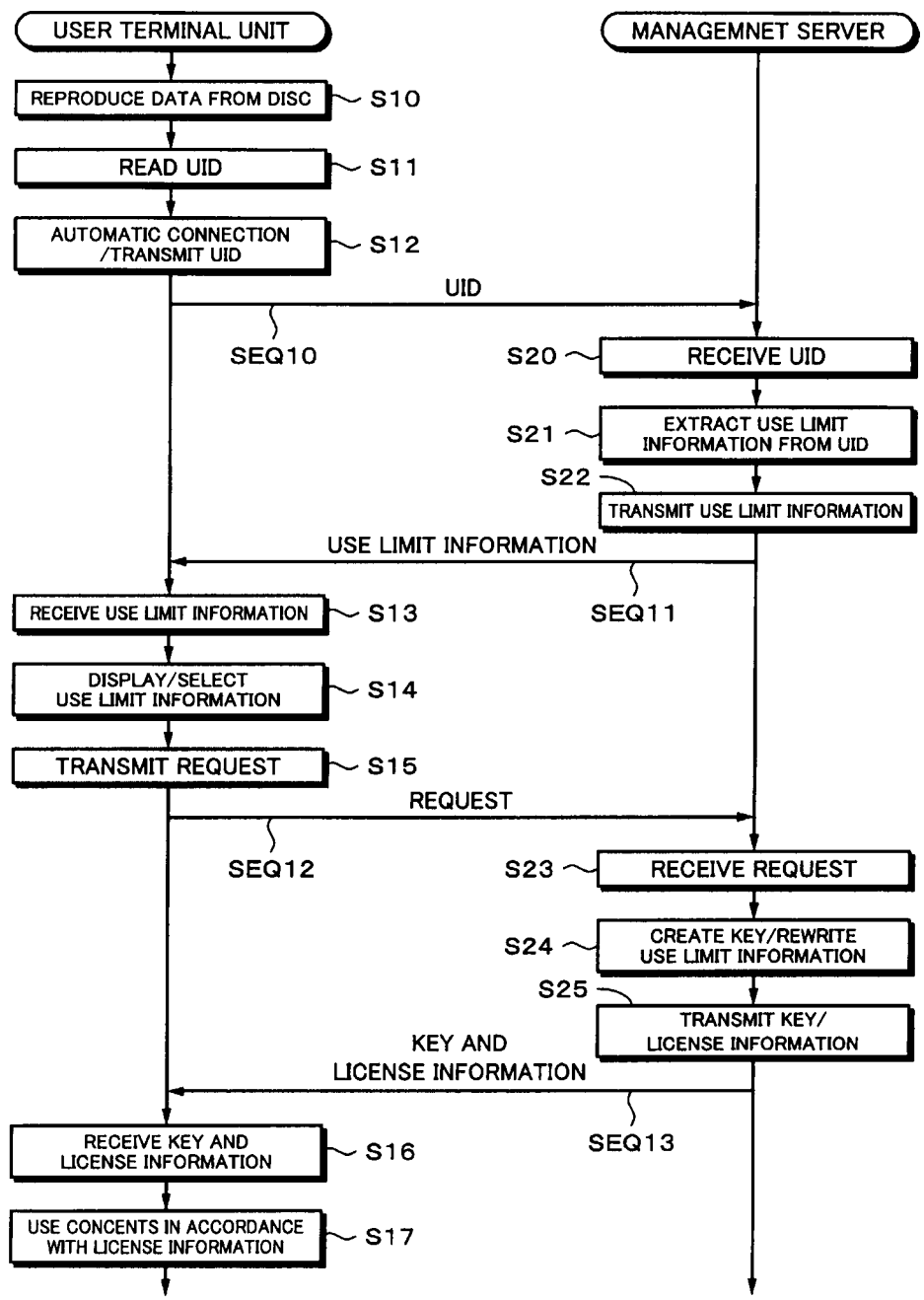
FIG. 9 is a sequence chart showing an example of a process performed by an information terminal unit and the management server when a disc is used.

FIG. 9 shows an example of a process performed by the information terminal unit 30 and the management server 20 when the user uses the disc 100. First, the user loads the disc 100 into the information terminal unit 30. The information terminal unit 30 reproduces data from the disc 100 (at step S10). The UID is read from the disc 100 (at step S11). After the UID has been read, at step S12, the information terminal unit 30 is automatically connected to the management server 20 through the Internet 31. The UID that has been read from the disc 100 is transmitted to the management server 20 (in SEQ 10).

The uniform resource locator (URL) of the management server 20 on the Internet 31 can be pre-recorded in a predetermined area of the disc 100. When the UID is read at step S11, the area is also accessed for the URL. As the predetermined area, for example a sub code area can be used. Alternatively, as information of the UID, the URL can be further recorded. In addition, the URL of the management server 20 may be pre-stored in a non-volatile storing means that the information terminal unit 30 has.

The UID that has been transmitted in SEQ 10 is received by the management server 20 at step S20. At step S21, the management server 20 searches for management information corresponding to the received UID. The management server 20 extracts the use limit information for the contents recorded on the disc 100 on which the UID has been recorded from the searched management information. At step S22, the extracted use limit information is transmitted to the information terminal unit 30 (in SEQ 11).

At step S13, the use limit information transmitted from the management server 20 in SEQ 11 is received by the information terminal unit 30. The information terminal unit 30 prompts the user to select the use mode of the disc 100 loaded into the information terminal unit 30 and reproduced at step S10 on a display means thereof in accordance with the received use limit information (at step S14).

When the received use limit information represents that the number of times the contents can be reproduced, the reproduction expiration date and time, and the number of times the contents can be copied are unlimited, unlimited, and five times, respectively, they are displayed on the display means of the information terminal unit 30. In addition, the information terminal unit 30 prompts the user to reproduce the contents of the disc 100, copy the contents of the disc 100 to another recording medium, or perform no operation.

When the received use limit information represents that the number of times the contents can be reproduced, the reproduction expiration date and time, and the number of times the contents can be copied are five times, more 25 days, and zero time, respectively, they are displayed on the display means. In addition, the information terminal unit 30 prompts the user whether to reproduce the contents recorded on the disc 100. In this case, since the number of times the contents can be copied is zero time, the contents are prohibited from being copied. Thus, the information terminal unit 30 does not prompt the user to copy the contents.

When the user selects the use mode of the disc 100 loaded into the information terminal unit 30 in accordance with the indication at step S14, the flow advances to step S15. At step S15, a request in accordance with the selected use mode is transmitted from the information terminal unit 30. In this case, it is assumed that as the use mode of the disc 100 the user has selected a copy operation for contents recorded on the disc 100 to another recording medium.

In SEQ 12, the request is transmitted from the information terminal unit 30 to the management server 20. At step S23, the request is received by the management server 20. When the request is received by the management server 20, the flow advances to step S24. At step S24, the management server 20 rewrites its managed use limit information in accordance with the received request.

When the use limit information managed by the management server 20 represents that the number of times the contents can be copied is five times and the request represents that contents recorded on the disc 100 is to be copied to another recording medium one time, the number of times the contents can be copied of the use limit information is decreased by one and rewritten as four times.

When the user repeats the copy operation for the contents of the disc 100 and the number of times the contents can be copied of the use limit information is rewritten to zero time, the user loses the license for copying the contents recorded to another recording medium is created.

In addition, at step S24, a key that allows the user to use the disc 100 in the requested use mode is created. In the example, a key that allows the information terminal unit 30 to copy the contents recorded on the disc 100 on which the UID has been recorded to be recorded to another recording medium.

The key created at step S24 is transmitted from the management server 20 to the information terminal unit 30 along with license information in accordance with the use limit information rewritten at step S24 (at step S25, in SEQ 13). At step S16, the key and the license information are received by the information terminal unit 30. With the received key, the information terminal unit 30 uses the disc 100 in accordance with the license represented with the license information (at step S17).

The license information contains information that represents relevant contents and information that represents the use mode for the contents. The information terminal unit 30 may display the received license information on the display means and ask the user whether or not to accept it.

The key functions as for example a flag that controls a predetermined operation of the information terminal unit 30. Alternatively, the contents recorded on the disc 100 may have been encrypted. The key may be a decryption key that allows the encrypted contents to be decrypted. In this case, the key is created with the UID. When the information terminal unit 30 side combines the key received from the management server 20 and the UID recorded on the disc 100, the key may be used as a decryption key that allows contents to be decrypted.

It is preferred that all the process described in FIG. 9 except the display process for the user and the user input process are executed on background namely automatically without an intervention of the user. Thus, the user can only load the disc 100 into a data reproducing unit 200 that will be described later and select the use mode of the disc.

In the foregoing example, all the management information of each UID is managed by the management server 20. Alternatively, the management information may be transferred to the user side information terminal unit 30.

For example, when the use limit information of a particular UID represents that the number of times the contents can be copied ten times, the use limit information that allows the contents to be copied three times is transferred to the information terminal unit 30 side and the use limit information that allows the contents to be copied seven times is left in the management server 20 side. In this case, when the user copies the contents recorded on the disc 100 identified by the UID three times, he or she needs to only rewrite the management information of the information terminal unit 30. Thus, the user does not need to access the management server 20. In this case, the information terminal unit 30 side can perform all the process shown in FIG. 9 of the management server 20.

After the number of times the contents can be copied of the management information of the information terminal unit 30 becomes zero time, whenever the information terminal unit 30 copies the contents recorded on the disc 100 to another disc, the information terminal unit 30 accesses the management server 20 and obtains the key and the license information in accordance with the sequence and steps shown in FIG. 9.

When the management information is transferred to the information terminal unit 30 side, the management information is stored in the information terminal unit 30 in such a manner that the management information cannot be easily forged. For example, a non-volatile memory that stores management information can be disposed in the information terminal unit 30. Alternatively, management information may be written in a unique format to a hard disk drive that the information terminal unit 30 has so that the management information can be accessed by only dedicated software.

Figure 10:
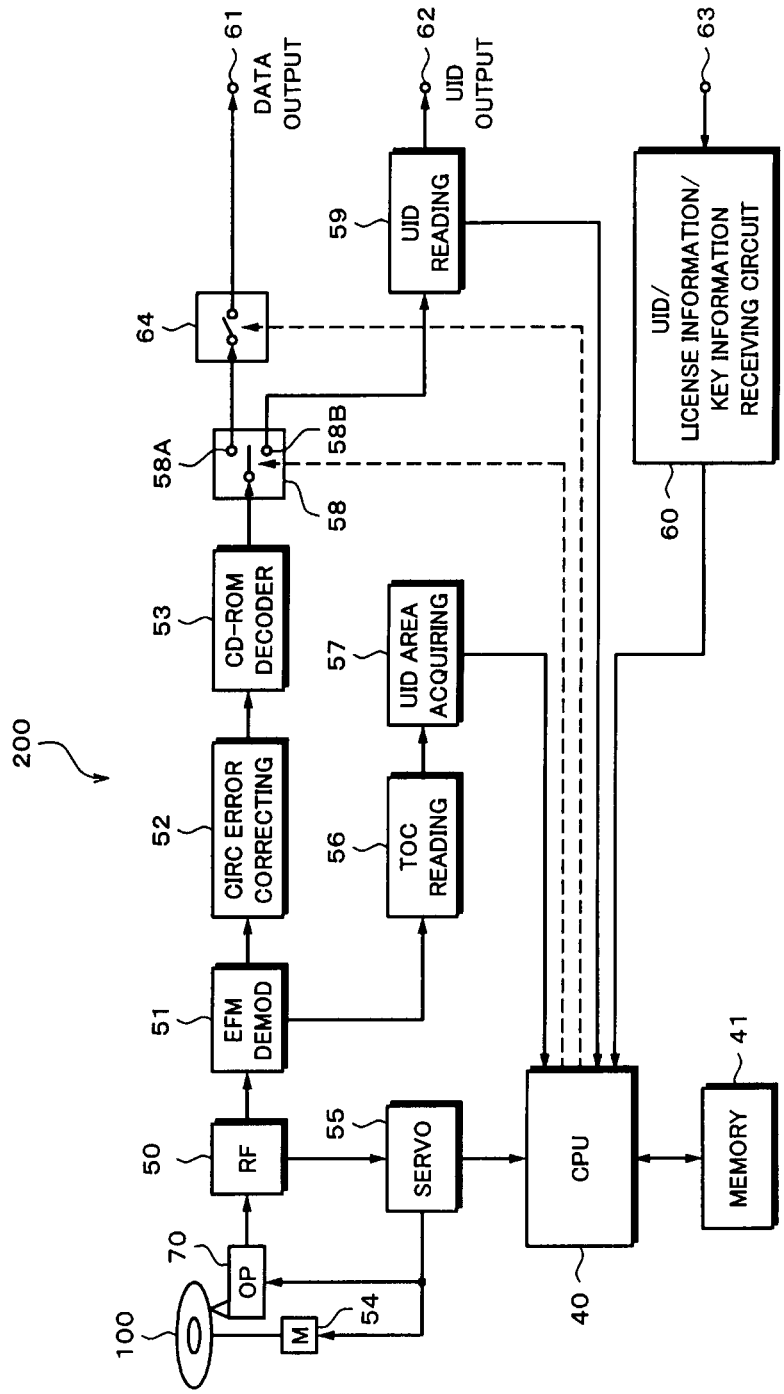
FIG. 10 is a block diagram showing a structure of an example of a data reproducing unit according to the embodiment of the present invention.

FIG. 10 shows a structure of an example of a data reproducing unit according to an embodiment of the present invention. The data reproducing unit 200 is built in the foregoing information terminal unit 30. The entire data reproducing unit 200 is controlled by a Central Processing Unit (CPU) 40. The CPU 40 has a RAM (not shown) as a work memory and a ROM (not shown) in which a program such as firmware is pre-recorded. The CPU 40 controls the data reproducing unit 200 in accordance with a program recorded in the ROM. In addition, the CPU 40 has an interface connected to the main body of the information terminal unit 30. The data reproducing unit 200 can be controlled from the information terminal unit 30 through the interface.

An optical system OP 70 comprises an optical pickup portion that reproduces data from the disc 100, a controlling circuit that controls the power and focus of the optical pickup portion, a thread motor drive that controls the position of the optical pickup, a controlling circuit that controls the thread motor drive, and so forth. The optical pickup portion has an optical block and a converting portion. The optical block has an objective lens, a laser light source, and a light receiving portion that receives laser light reflected by the disc 100. The converting portion converts laser light received by the light receiving portion into an electric signal.

A motor M 54 is a spindle motor that drives rotations of the disc 100 loaded into the data reproducing unit 200. The optical system OP 70 and the motor M 54 are controlled by a servo circuit 55 in a predetermined manner. The servo circuit 55 is controlled by the CPU 40.

The reproducing system drives rotations of the disc 100 at Constant Linear Velocity (CLV) under the control of the servo circuit 55. The optical system OP 70 controls the intensity of the laser light so that the contents can be properly reproduced. The optical system OP 70 radiates the laser light to the disc 100. The laser light is reflected on the disc 100 and received by the light receiving portion. The light receiving portion converts the received light into an electric signal as a reproduction signal. The reproduction signal is output from the optical system OP 70 and supplied to an RF portion 50. The RF portion 50 performs a predetermined signal process such as a waveform trimming process for the reproduction signal and outputs a reproduction digital signal.

The RF portion 50 extracts a clock from the reproduction signal that is output from the optical system OP 70 and supplies the clock to the servo circuit 55.

The reproduction digital signal that is output from the RF portion 50 is supplied to an Eight-to-Fifteen Modulation (EFM) demodulating circuit 51. The EFM demodulating circuit 51 demodulates a signal that was EFM-modulated when data was recorded and outputs reproduction digital data. The reproduction digital data is supplied to a Cross Interleave Reed-Solomon Code (CIRC) error correcting circuit 52. In addition, the reproduction digital data is supplied to a Table Of Contents (TOC) reading circuit 56.

The CIRC error correcting circuit 52 decodes the supplied reproduction digital data with the CIRC error correction code and corrects an error thereof. The reproduction data that has been error-corrected by the CIRC error correcting circuit 52 is supplied to a CD-ROM decoder 53. The CD-ROM decoder 53 decodes the error correction code in accordance with the CD-ROM and further corrects an error of the reproduction data. Output data of the CD-ROM decoder 53 is supplied to a switch circuit 58.

On the other hand, when the optical system OP 70 accesses a lead-in area of the disc 100, the TOC reading circuit 56 reads TOC data from the supplied reproduction digital data. The TOC data that has been read is supplied to a UID area acquiring circuit 57. The UID area acquiring circuit 57 reads information that represents the recorded position of the UID from the supplied TOC data.

The position information that represents the recorded position of the UID is output from the UID area acquiring circuit 57 to the CPU 40. The CPU 40 controls a switch circuit 58 in accordance with the position information. In other words, the CPU 40 controls the switch circuit 58 so that the switch circuit 58 selects a terminal 58B at a timing of which the CD-ROM decoder 53 outputs the UID. The CPU 40 controls the switch circuit 58 so that the switch circuit 58 selects a terminal 58A at other timings. An output of the terminal 58A of the switch circuit 58 is sent to an output terminal 61 through a switch circuit 64.

An output of the terminal 58B of the switch circuit 58 is supplied to a UID reading circuit 59. The UID reading circuit 59 reads a UID from the supplied data. The UID that has been read is supplied to the CPU 40 and stored in a predetermined area of a memory 41. In addition, the UID is supplied to a terminal 62. As described above, the UID supplied to the terminal 62 is transmitted to the management server 20. The UID is supplied from the terminal 62 to the main body of the information terminal unit 30. Using the communication function of the main body of the information terminal unit 30, the UID is transmitted to the Internet 31. Alternatively, the data reproducing unit 200 may have a communication function to the Internet 31.

The information terminal unit 30 and the management server 20 perform the process as described with reference to FIG. 9 in accordance with the UID read from the disc 100 and transmitted from the information terminal unit 30. In the process, a key and license information are transmitted from the management server 20 to the information terminal unit 30 (in SEQ 13 shown in FIG. 9). This signal is received by the information terminal unit 30 and input from a terminal 63 to the data reproducing unit 200. A UID/license information/key information receiving circuit 60 extracts the key and license information from the supplied signal. The extracted key and license information are supplied to the CPU 40 and stored in a memory 41.

The CPU 40 outputs a control signal that controls the reproduction of the disc 100 loaded into the data reproducing unit 200 in accordance with the key and/or license information. When the key and/or license information prohibits the contents recorded on the disc 100 from being reproduced, the CPU 40 outputs a control signal that turns off (closes) the switch circuit 64.

Thus, data that is reproduced from the disc 100 is not output to the outside of the data reproducing unit 200. As a result, the contents recorded on the disc 100 cannot be reproduced and copied to another recording medium.

When the disc 100 is a CD-DA disc (not shown), data is extracted from the CIRC error correcting circuit 52. The data is output to the outside through circuits corresponding to the switch circuit 58 and the switch circuit 64. Likewise, the data is supplied to the UID reading circuit 59 through a circuit corresponding to the switch circuit 58. The UID reading circuit 59 reads the UID.

The reproduction control using the key and/or license information is not limited by on/off control of the switch circuit 64. Alternatively, the reproduction control may be performed by for example the CD-ROM decoder 53.

Alternatively, in SEQ 13 shown in FIG. 9, in addition to the key and license information, the UID transmitted from the information terminal unit 30 to the management server 20 in SEQ 10 may be transmitted from the management server 20 to the information terminal unit 30. When the UID is received by the information terminal unit 30, the UID is supplied from the terminal 63 to the UID/license information/key information receiving circuit 60 and then sent to the CPU 40. When the disc 100 is loaded into the data reproducing unit 200, the UID is read from the TOC. By comparing the UID stored in the memory 41 and the UID transmitted from the management server 20, it can be determined whether or not a communication process is properly preformed between the information terminal unit 30 and the management server 20.

Alternatively, when the information terminal unit 30 side receives the UID transmitted from the management server 20 in SEQ 13, the information terminal unit 30 may re-read the UID from the disc 100 loaded into the data reproducing unit 200 and compare the UID that has been read and the UID transmitted from the management server 20. Thus, it may be determined whether or not key and license have been given for a valid disc.

The copy control for contents recorded on the disc 100 to another recording medium may be performed by the data reproducing unit 200. Next with reference to FIG. 11, an example of a method for causing the data reproducing unit 200 to control a data recording unit 300 will be described. The data recording unit 300 records input data on a recording medium 302 such as a CD-R disc or a CD-RW disc under the control of a CPU 301.

In FIG. 11, similar portions to those in FIG. 10 are denoted by similar reference numerals and their description will be omitted. In FIG. 11, for simplicity, in the data reproducing unit 200, only a CPU 40 that controls all the portions of the data reproducing unit 200 is shown. Other portions are omitted. Likewise, in the data recording unit 300, only a CPU 301 that controls all the portions of the data recording unit 300 is shown. Other portions are omitted.

The data reproducing unit 200 reproduces data from the disc 100 and supplies the data to the data recording unit 300. As the data reproducing unit 200 reproduces data form the disc 100, the data reproducing unit 200 performs the process as shown in FIG. 9 with the management server 20 (not shown). In this process, the CPU 40 outputs a control signal that controls to copy contents recorded on the disc 100 to another recording medium in accordance with the key and license information transmitted from the management server 20. The control signal is supplied to the CPU 301 of the data recording unit 300.

The CPU 301 controls whether or not to record data that is input to the data recording unit 300 to the recording medium 302 in accordance with a control signal supplied from the CPU 40 of the data reproducing unit 200. Thus, the data reproducing unit 200 side can control the data recording unit 300 that record data to the recording medium 302. As a result, the data recording unit 300 can restrict a copy operation for contents recorded on the disc 100 to another disc. In the foregoing example, the recording medium 302 is an optical disc such as a CD-R disc or a CD-RW disc. However, the present invention is not limited to such an recording medium. The recording medium 302 may be another type of a recording medium on which digital data can be recorded such as a hard disk drive, a semiconductor memory, or a magneto-optical disc. In addition, the data recording unit 300 may be build in an information terminal unit such as a computer unit. Alternatively, the data recording unit 300 may be built in the information terminal unit 30 along with the data reproducing unit 200. Alternatively, the data recording unit 300 may be connected to the information terminal unit 30 and used along with the data reproducing unit 200.

In the foregoing example, the disc 100 is a CD on which data cannot be recorded by a ordinary user. However, it should be noted that the present invention is not limited to such an example. Even if the disc 100 is a CD-R disc, if it has been finalized, the user cannot additionally record data on the disc 100. Thus, the present invention can be applied to the case that contents are sold as a finalized CD-R disc.

As described above, according to the present invention, each disc can be identified with a UID. In addition, since management information for each UID is stored in the server, different services can be provided to discs on which the same contents are recorded.

For example, even if contents recorded on discs are the same, the values corresponding to the fees the user paid can be added to the discs.

In addition, according to the embodiment of the present invention, each disc can be identified with a UID. In addition, since license information for each UID is stored in the server. Thus, the copyright of contents recorded on each disc can be managed for each disc.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A reproducing controlling method, comprising:
   receiving, by a client device, identification information unique to a data recording medium from the data recording medium;
   transmitting, from the client device, the received identification information and information that represents a use mode of the data recording medium to a server, wherein the server correlatively stores the identification information and management information corresponding to the data recording medium, and updates the management information when the transmitted identification information and the information that represents a use mode of the data recording medium are received from the client device;
   receiving, by the client device, key data and license information generated in accordance with the updated management information by the server, wherein the key data controls whether to reproduce content data recorded on the data recording medium or to record the content data recorded on the data recording medium; and
   controlling, by the client device, whether to reproduce the content data or to record the content data based on the received key data.

2. The reproducing controlling method as set forth in claim 1, further comprising:
   receiving, by the client device, the management information related to the transmitted identification information from the server; and
   displaying, by the client device, the received management information on a display of the client device.

3. The reproducing controlling method as set forth in claim 1, further comprising:
   displaying, by the client device, the license information for the content data on a display of the client device, wherein the license information for the content data is further added to the key data in accordance with the management information.

4. The reproducing controlling method as set forth in claim 1, further comprising:
   extracting, by the server, use limit information based on the received identification information; and
   transmitting, by the server, the extracted use limit information to the client device prior to the receiving, by the client device, of the generated key data and the generated license information.

5. A reproducing controlling system, comprising:
   receiving circuitry, at a client device, that receives identification information unique to a data recording medium from the data recording medium;
   an interface, at the client device, that transmits the received identification information and information that represents a use mode of the data recording medium to a server, wherein the server correlatively stores the identification information and management information corresponding to the data recording medium, and updates the management information when the transmitted identification information and the information that represents a use mode of the data recording medium are received from the client device, and that receives, from the server, key data and license information generated in accordance with the updated management information, wherein the key data controls whether to reproduce content data recorded on the data recording medium or to record the content data recorded on the data recording medium; and
   a processor, at the client device, that controls whether to reproduce the content data or to record the content data based on the received key data.

6. The reproducing controlling system as set forth in claim 5, further comprising:
   the interface at the client device receives the management information related to the transmitted identification information from the server; and
   a display, at the client device, displays the received management information.

7. The reproducing controlling system as set forth in claim 5, further comprising:
   a display, at the client device, displays the license information for the content data, wherein the license information for the content data is further added to the key data in accordance with the management information.

8. A client device comprising:
   receiving circuitry that receives identification information unique to a data recording medium from the data recording medium;
   an interface that transmits the received identification information and information that represents a use mode of the data recording medium to a server, wherein the server correlatively stores the identification information and management information corresponding to the data recording medium, and updates the management information when the transmitted identification information and the information that represents a use mode of the data recording medium are received from the client device, and that receives, from the server, key data and license information generated in accordance with the updated management information, wherein the key data controls whether to reproduce content data recorded on the data recording medium or to record the content data recorded on the data recording medium; and
   a processor controls whether to reproduce the content data or to record the content data based on the received key data.

9. The client device as set forth in claim 8, further comprising:
   a display displays the license information for the content data, wherein the license information for the content data is further added to the key data in accordance with the management information.

10. A non-transitory computer-readable recording medium including computer program instructions, which when executed by a client device, cause the client device to perform a method comprising:
    receiving identification information unique to a data recording medium from the data recording medium;
    transmitting the received identification information and information that represents a use mode of the data recording medium to a server, wherein the server correlatively stores the identification information and management information corresponding to the data recording medium, and updates the management information when the transmitted identification information and the information that represents a use mode of the data recording medium are received from the client device;
    receiving key data and license information generated in accordance with the updated management information from the server, wherein the key data controls whether to reproduce content data recorded on the data recording medium or to record the content data recorded on the data recording medium; and
    controlling whether to reproduce the content data or to record the content data based on the received key data.

* * * * *